US012723988B2

(12) United States Patent
Chan et al.

(10) Patent No.: US 12,723,988 B2
(45) Date of Patent: Sep. 1, 2026

(54) OPTICAL INSPECTION SYSTEM OF ELIMINATING IMAGE NOISE

(71) Applicant: Gudeng Equipment Co., LTD., New Taipei City (TW)

(72) Inventors: Che-Wei Chan, Tainan City (TW); Lin-Hsin Tu, Hsinchu City (TW); Yu-Jen Su, Hsinchu City (TW)

(73) Assignee: Gudeng Equipment Co., LTD., New Taipei City (TW)

( * ) Notice: Subject to any disclaimer, the term of this patent is extended or adjusted under 35 U.S.C. 154(b) by 211 days.

(21) Appl. No.: 18/611,731

(22) Filed: Mar. 21, 2024

(65) Prior Publication Data

US 2025/0189458 A1 Jun. 12, 2025

(30) Foreign Application Priority Data

Dec. 11, 2023 (TW) ................................ 112148097

(51) Int. Cl.
*G01N 21/88* (2006.01)
*G01N 21/956* (2006.01)

(52) U.S. Cl.
CPC ..... *G01N 21/8806* (2013.01); *G01N 21/8851* (2013.01); *G01N 21/95684* (2013.01); *G01N 2021/8848* (2013.01)

(58) Field of Classification Search
CPC ........... G01N 21/8806; G01N 21/8851; G01N 21/95684; G01N 2021/8848
See application file for complete search history.

(56) References Cited

U.S. PATENT DOCUMENTS

2002/0088952 A1 7/2002 Rao
2021/0360140 A1 11/2021 Katzir

FOREIGN PATENT DOCUMENTS

CN 205562358 U * 9/2016 ............. G01N 21/84
CN 213364606 U * 6/2021 ............. G01N 21/88
TW 201514480 A 4/2015
TW 201629470 A 8/2016
TW M599908 U 8/2020

* cited by examiner

*Primary Examiner* — Jamil Ahmed
(74) *Attorney, Agent, or Firm* — Winston Hsu

(57) ABSTRACT

An optical inspection system of removing a pattern relevant to surface metallic texture on circuits from an image to be inspected includes a first light source module, an image forming module and an operation processor. The first light source module includes a first polarizer and a linear light source. The first polarizer has a first polarization axis. The linear light source emits a linear light beam which passes through the first polarizer to project polarization beam onto the circuits. The image forming module includes a second polarizer and an optical detector. The optical detector receives a reflection beam generated by the linear polarization beam being reflected from the circuits and passing through the second polarizer. The operation processor receives the image to be inspected generated by the reflection beam, and analyzes the image to be inspected for determining whether the circuits have any defect except the surface metallic texture.

8 Claims, 4 Drawing Sheets

OPTICAL INSPECTION SYSTEM OF ELIMINATING IMAGE NOISE

BACKGROUND OF THE INVENTION

1. Field of the Invention

The present invention relates to an optical inspection system, and more particularly, to an optical inspection system of removing a pattern relevant to surface metallic texture on a circuit from an image to be inspected.

2. Description of the Prior Art

A conventional optical inspection technology takes photos of a target object to acquire an image to be inspected, and the image to be inspected is analyzed by an image identification algorithm to find out a required feature point, such as various defects. When the target object is a metal circuit, the metal circuit has surface metallic texture, and the required feature point may be an unexpected object or a scratch on the metal circuit. The conventional optical identification algorithm has to remove or eliminate a pattern of the surface metallic texture from the image to be inspected by complex and large-scale computation to accurately identify the defect on the metal circuit, and has drawbacks of long computation period and poor inspection accuracy. The conventional optical identification algorithm needs more cost to complete image analysis procedure and is difficult to apply for a rapid inspection demand in the consumer market.

SUMMARY OF THE INVENTION

The present invention provides an optical inspection system of removing a pattern relevant to surface metallic texture on a circuit from an image to be inspected for solving above drawbacks.

According to the claimed invention, an optical inspection system of removing a pattern relevant to surface metallic texture on a circuit from the image to be inspected is disclosed. The optical inspection system includes a first light source module, an image forming module and an operation processor. The first light source module includes a first polarizer and a linear light source. The first polarizer is disposed on a position facing the circuit, and has a first polarization axis. The linear light source is adapted to emit a linear polarization beam passing through the first polarizer to project onto the circuit. The image forming module is disposed adjacent to the first light source module. The image forming module includes a second polarizer and an optical detector. The second polarizer is disposed on another position facing the circuit and different from the first polarizer, a second polarization axis of the second polarizer is intersected by the first polarization axis. The optical detector is adapted to receive a reflection beam generated by the linear polarization beam reflected from the circuit and passing through the second polarizer. The operation processor is electrically connected to the optical detector, and adapted to receive the image to be inspected generated by the reflection beam, and further to analyze the image to be inspected for determining whether the circuit has any defect except the surface metallic texture.

According to the claimed invention, an inspection optical axis of the optical detector is substantially parallel to a planar normal vector of the circuit, and an included angle between an output optical axis of the linear light source and the planar normal vector is set to be between sixty degrees and seventy-five degrees.

According to the claimed invention, the optical inspection system further includes a second light source module disposed on a position around the image forming module and opposite to the first light source module.

According to the claimed invention, a polarization axis of a first polarizer of the second light source module is intersected by the first polarization axis of the first polarizer of the first light source module.

According to the claimed invention, the reflection beam generated by the linear polarization beam projected onto the surface metallic texture is filtered by the second polarizer.

According to the claimed invention, the reflection beam generated by the linear polarization beam projected onto the defect of the circuit via scattering or diffusion is received by the optical detector. The defect is an unexpected object or a scratch on the circuit.

According to the claimed invention, the operation processor analyzes each pixel column or each pixel row of the image to be inspected to find out the defect when the surface metallic texture is filtered from the image to be inspected.

According to the claimed invention, the operation processor decides a position of at least one pixel within the image to be inspected has the defect when a difference between a grey level of the at least one pixel within the image to be inspected and a grey level computation value of pixels within the image to be inspected is greater than a preset threshold.

The optical inspection system of the present invention can utilize high reflection property of the surface metallic texture on the metal circuit to reflect the linear polarization beam without the scattering or the diffusion, for generating the reflection beam with the linear polarization property; the defect, such as the unexpected object or the scratch, on the metal circuit can transform the linear polarization beam into the reflection beam that does not have the linear polarization property via the scattering or the diffusion due to the irregular shape, and the reflection beam that is reflected from the surface metallic texture and has the linear polarization property can be filtered by the second polarizer, so that the reflection beam that is generated by the defect and does not have the linear polarization property can pass through the second polarizer and be received by the optical detector. The operation processor can acquire the image to be inspected that reserves the pattern of the defect and eliminates the pattern of the surface metallic texture, and the defect can be accurately and rapidly identified via an image identification algorithm with low computation. The present invention can preferably set position relation between the first light source module and the image forming module through the included angle (such as the sixty degrees to seventy-five degrees mention as above). Therefore, the present invention can provide the optimal relative position of the first light source module and the image forming module in response to multiple practical verifications, and can achieve the preferred image identification effect with the simple optical systematic configuration, so as to have advantages of low cost, high identification accuracy and high market competition.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
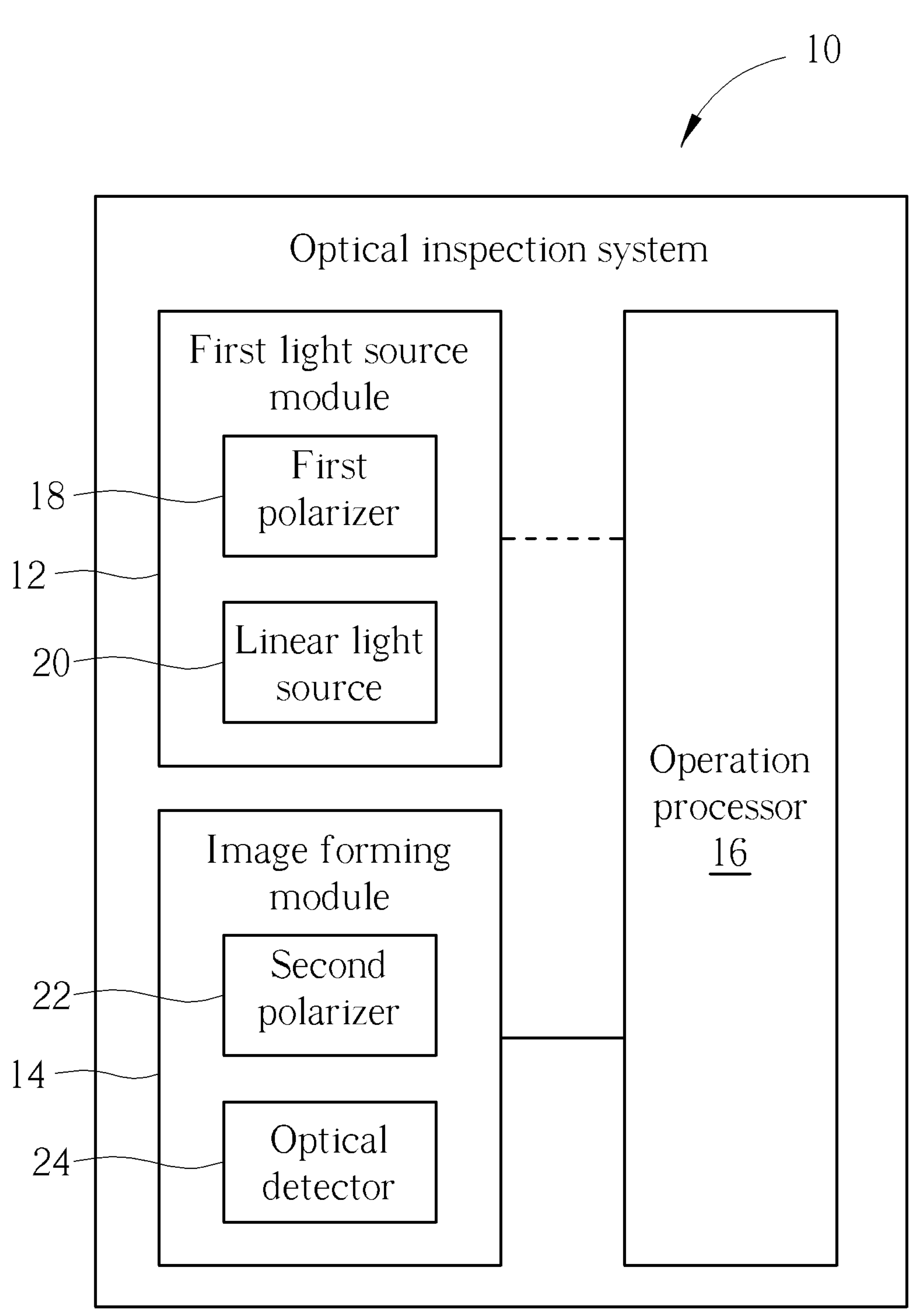
FIG. 1 is a functional block diagram of an optical inspection system according to an embodiment of the present invention.
Figure 2:
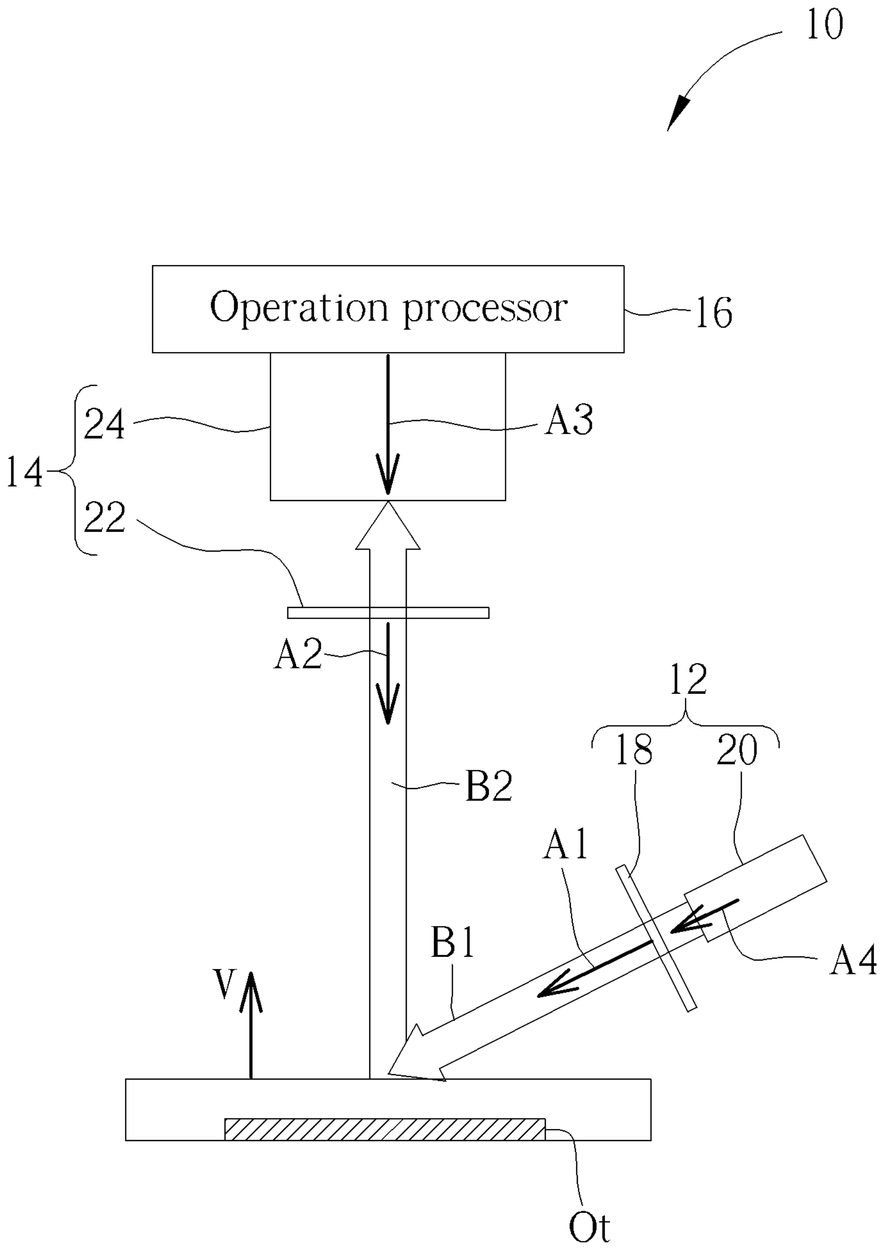
FIG. 2 is an application diagram of the optical inspection system according to the embodiment of the present invention.
Figure 3:
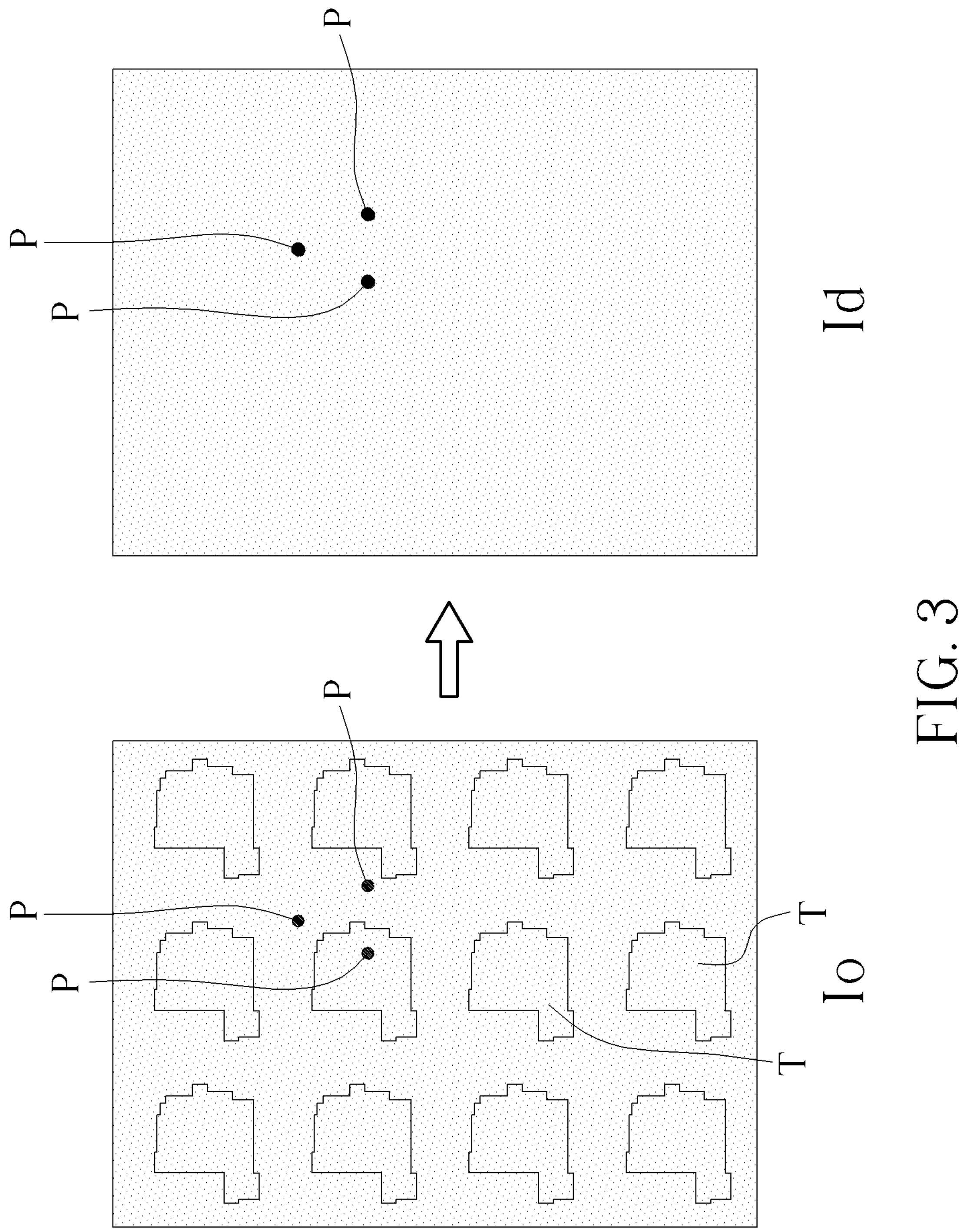
FIG. 3 is a diagram of an image to be inspected acquired by the optical inspection system according to the embodiment of the present invention.

Please refer to FIG. 1 to FIG. 3. FIG. 1 is a functional block diagram of an optical inspection system 10 according to an embodiment of the present invention. FIG. 2 is an application diagram of the optical inspection system 10 according to the embodiment of the present invention. FIG. 3 is a diagram of an image to be inspected Id acquired by the optical inspection system 10 according to the embodiment of the present invention. The optical inspection system 10 can include a first light source module 12, an image forming module 14 and an operation processor 16. The optical inspection system 10 can detect a defect P on a surface of a target object Ot. In the embodiment, the target object Ot can be one or some circuits (such as slash areas shown in FIG. 2) inside the transparent substrate, and the defect P can be an unexpected object or a scratch on the circuit, which depends on an actual demand. The optical inspection system 10 can effectively remove or eliminate a pattern (that is relevant to surface metallic texture T on the circuit) from the image to be inspected Id, so as to rapidly and accurately identify whether the circuit has the defect P that needs to be identified. The image forming module 14 and the operation processor 16 can be monolithically integrated as a single unit, or can be designed as two independent units, which depends on the actual demand.

The first light source module 12 can include a first (linear) polarizer 18 and a linear light source 20. The first polarizer 18 can be disposed on a position facing the target object Ot (which means the circuit inside the transparent substrate), and has a first polarization axis A1. The linear light source 20 can emit a linear polarization beam B1, and the linear polarization beam B1 can pass through the first polarizer 18 to project onto the target object Ot. The image forming module 14 can be disposed adjacent to the first light source module 12, and includes a second (linear) polarizer 22 and an optical detector 24. The second polarizer 22 can be disposed on another position facing the target object Ot and different from the first polarizer 18, so as to prevent an optical receive path of the image forming module 14 from being affected by an optical inspection path of the first light source module 12. A second polarization axis A2 of the second polarizer 22 can be intersected by the first polarization axis A1. The optical detector 24 can be disposed on a side of the second polarizer 22 opposite to the target object Ot, and adapted to receive a reflection beam B2 generated by the linear polarization beam B1 projected onto and being reflected from the target object Ot and then passing through the second polarizer 22.

The operation processor 16 can be a built-in processor of the camera apparatus, or an external processor outside the camera apparatus. The camera apparatus can optionally include a lens assembly suitable for the camera lens; a number and a function of optical elements of the lens assembly can depend on a design demand, and a detailed description is omitted herein for simplicity. The operation processor 16 can acquire and analyze the image to be inspected Id generated by the reflection beam B2, and remove or eliminate the pattern of the surface metallic texture T from the image to be inspected Id for determining whether there is the defect P on the target object Ot, without interference of the surface metallic texture T. As shown in FIG. 3, for the same target object Ot, an original image Io is captured by a conventional optical inspection apparatus and has the clear surface metallic texture T and the clear defect P; a complex algorithm is necessary to distinguish the surface metallic texture T from the defect P for deciding coordinates and the number of the defect P. In the present invention, the optical inspection system 10 can capture the image to be inspected Id of the target object Ot, and then remove or eliminate the surface metallic texture T from the image to be inspected Id, which means the image to be inspected Id does not have the pattern of the surface metallic texture T and still has the pattern of the defect P.

An inspection optical axis A3 of the optical detector 24 can be preferably parallel to a planar normal vector V of the target object Ot, and an included angle between an output optical axis A4 of the linear light source 20 and the planar normal vector V can be preferably set to be between sixty degrees and seventy-five degrees; a value of the included angle is not limited to the foresaid example. That is to say, the image forming module 14 can be directly disposed above the target object Ot, and the first light source module 12 can be disposed by a side of the image forming module 14 and adapted to laterally emit the linear polarization beam B1 towards the target object Ot. The reflection beam B2 that is generated by reflection of the linear polarization beam B1 projected onto the surface metallic texture T of the target object Ot can have linear polarization property, and therefore can be filtered by the second polarizer 22 and cannot be received by the optical detector 24; the reflection beam B2 that is generated by reflection of the linear polarization beam B1 laterally projected from the optical inspection system 10 onto the defect P of the target object Ot via scattering or diffusion does not have the linear polarization property, and then can pass through the second polarizer 22 and be received by the optical detector 24.

When the optical inspection system 10 acquires the image to be inspected Id without the pattern of the surface metallic texture T in a polarization filtering manner, the optical inspection system 10 can analyze each pixel column or each pixel row of the image to be inspected Id to find out the defect P. For example, the optical inspection system 10 can optionally compute a grey level computation value of pixels within the image to be inspected Id, such as a grey level mean value of all pixels, or a grey level mean value of some pixels that exclude extreme grey levels; variation of the grey level computation value can depend on the design demand. Then, the optical inspection system 10 can analyze and determine whether a difference between a grey level of each pixel within the image to be inspected Id and the foresaid grey level computation value is greater than a preset threshold; the preset threshold can be set in accordance with the grey level mean value of all pixels within the image to be inspected Id and a light intensity parameter of the linear light source 20 and any available information. If the foresaid difference is not greater than the preset threshold, the image to be inspected Id does not have the defect P located on the corresponding position of the related pixel; if the foresaid difference is greater than the preset threshold, the image to be inspected Id has the defect P located on the corresponding position of the related pixel, so that position information of the defect P can be recorded for other computation application.

Figure 4:
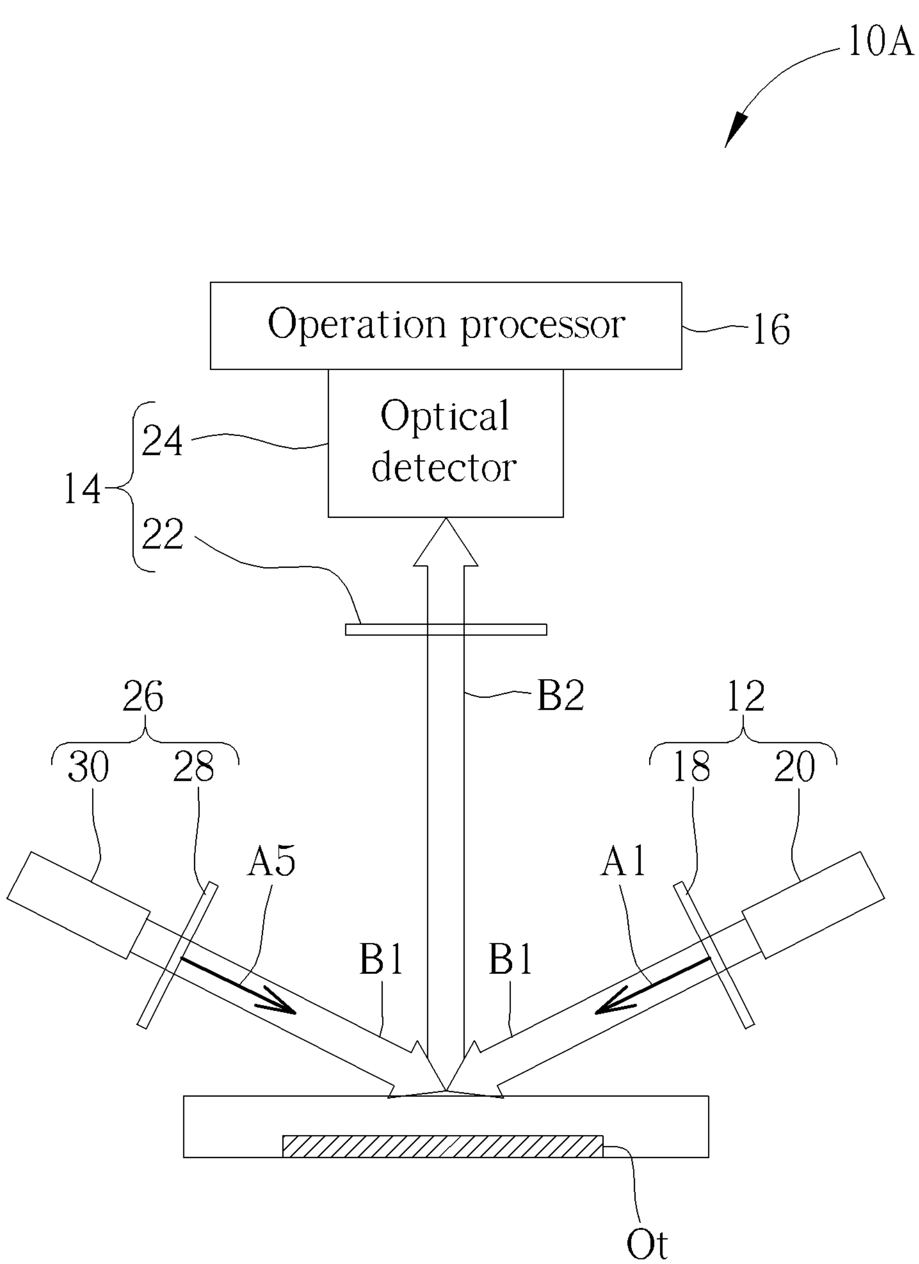
FIG. 4 is an application diagram of the optical inspection system according to another embodiment of the present invention.

Please refer to FIG. 4. FIG. 4 is an application diagram of the optical inspection system 10A according to another embodiment of the present invention. The optical inspection system 10A can include the first light source module 12, the image forming module 14, the operation processor 16 and a second light source module 26. In the embodiment, elements having the same numerals as ones of the foresaid embodiment have the same structures and functions, and the detailed description is omitted herein for simplicity. The second light source module 26 can be disposed on a position around the image forming module 14 and opposite to the first light source module 12; for example, the first light source module 12 and the second light source module 26 can be disposed on two opposite sides of the image forming module 14 in a symmetric manner, and positions of the first light source module 12 and the second light source module 26 is not limited to the foresaid embodiment. The second light source module 26 can include a third polarizer 28 and a linear light source 30. The third polarizer 28 can be disposed on the position facing the target object Ot, and a polarization axis A5 of the third polarizer 28 can be intersected by the first polarization axis A1 of the first polarizer 18 of the first light source module 12. The linear light source 30 can emit a linear polarization beam B1, and the linear polarization beam B1 can pass through the third polarizer 28 to project onto the target object Ot. The linear polarization beam B1 emitted from the second light source module 26 can be used to remove or eliminate the pattern of the surface metallic texture T from the image to be inspected Id but effectively reserve the pattern of the defect P in accordance with the optical path similar to design of the first light source module 12, and no further explanation is provided for simplicity.

In conclusion, the optical inspection system of the present invention can utilize high reflection property of the surface metallic texture on the metal circuit to reflect the linear polarization beam without the scattering or the diffusion, for generating the reflection beam with the linear polarization property; the defect, such as the unexpected object or the scratch, on the metal circuit can transform the linear polarization beam into the reflection beam that does not have the linear polarization property via the scattering or the diffusion due to the irregular shape, and the reflection beam that is reflected from the surface metallic texture and has the linear polarization property can be filtered by the second polarizer, so that the reflection beam that is generated by the defect and does not have the linear polarization property can pass through the second polarizer and be received by the optical detector. The operation processor can acquire the image to be inspected that reserves the pattern of the defect and eliminates the pattern of the surface metallic texture, and the defect can be accurately and rapidly identified via an image identification algorithm with low computation. The present invention can preferably set position relation between the first light source module and the image forming module through the included angle (such as the sixty degrees and seventy-five degrees mention as above). Therefore, the present invention can provide the optimal relative position of the first light source module and the image forming module in response to multiple practical verifications, and can achieve the preferred image identification effect with the simple optical systematic configuration, so as to have advantages of low cost, high identification accuracy and high market competition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical inspection system of removing a pattern relevant to surface metallic texture on a circuit from an image to be inspected, the optical inspection system comprising:

a first polarizer disposed on a position facing the circuit, and having a first polarization axis;

a linear light source configured to emit a linear light beam passing through the first polarizer to project polarization beam onto the circuit;

a second polarizer disposed on another position facing the circuit and different from the first polarizer, a second polarization axis of the second polarizer being intersected by the first polarization axis;

an optical detector adapted to receive a reflection beam generated by the linear polarization beam reflected from the circuit and passing through the second polarizer; and an operation processor electrically connected to the optical detector, and adapted to receive the image to be inspected generated by the reflection beam, and further to analyze the image to be inspected for determining whether the circuit has any defect except the surface metallic texture;

wherein the operation processor decides a position of at least one pixel within the image to be inspected has the defect when a difference between a grey level of the at least one pixel within the image to be inspected and a grey level computation value of pixels within the image to be inspected is greater than a preset threshold.

2. The optical inspection system of claim 1, wherein an inspection optical axis of the optical detector is substantially parallel to a planar normal vector of the circuit, and an included angle between an output optical axis of the linear light source and the planar normal vector is set to be between sixty degrees and seventy-five degrees.

3. The optical inspection system of claim 1, wherein the optical inspection system further comprises a third polarizer disposed on an assembly position around the second polarizer and the optical detector and opposite to assembly of the first polarizer and the linear light source.

4. The optical inspection system of claim 3, wherein a polarization axis of the third polarizer is intersected by the first polarization axis of the first polarizer.

5. The optical inspection system of claim 1, wherein the reflection beam generated by the linear polarization beam projected onto the surface metallic texture is filtered by the second polarizer.

6. The optical inspection system of claim 1, wherein the reflection beam generated by the linear polarization beam projected onto the defect of the circuit via scattering or diffusion is received by the optical detector.

7. The optical inspection system of claim 6, wherein the defect is an unexpected object or a scratch on the circuit.

8. The optical inspection system of claim 1, wherein the operation processor analyzes each pixel column or each pixel row of the image to be inspected to find out the defect when the surface metallic texture is filtered from the image to be inspected.

* * * * *